United States Patent
Pollak von Emhofen

(10) Patent No.: US 11,518,627 B2
(45) Date of Patent: Dec. 6, 2022

(54) METHOD FOR CONTROLLING TRAVEL WITHIN A TRANSFER ZONE FOR CONTAINERS OF TRANSPORT VEHICLES IN A TERMINAL FOR CONTAINERS, CONTROL SYSTEM FOR SAME, AND TERMINAL COMPRISING A CONTROL SYSTEM OF THIS KIND

(71) Applicant: Konecranes Global Corporation, Hyvinkää (FI)

(72) Inventor: Sascha Pollak von Emhofen, Frechen (DE)

(73) Assignee: Konecranes Global Corporation, Hyvinkää (FI)

( * ) Notice: Subject to any disclaimer, the term of this patent is extended or adjusted under 35 U.S.C. 154(b) by 418 days.

(21) Appl. No.: 16/647,518

(22) PCT Filed: Sep. 13, 2018

(86) PCT No.: PCT/EP2018/074792
§ 371 (c)(1),
(2) Date: Mar. 15, 2020

(87) PCT Pub. No.: WO2019/053150
PCT Pub. Date: Mar. 21, 2019

(65) Prior Publication Data
US 2020/0223647 A1    Jul. 16, 2020

(30) Foreign Application Priority Data
Sep. 15, 2017   (DE) .......................... 102017121496.8

(51) Int. Cl.
*B65G 63/00* (2006.01)
*G08G 1/09* (2006.01)

(52) U.S. Cl.
CPC ............. *B65G 63/004* (2013.01); *G08G 1/09* (2013.01); *B65G 2201/0235* (2013.01); *B65G 2203/0283* (2013.01); *B65G 2207/40* (2013.01)

(58) Field of Classification Search
CPC ................ B65G 63/045; B65G 63/004; B65G 2201/0235; B65G 2201/0283; G05D 1/0297; G08G 1/164
See application file for complete search history.

(56) References Cited

U.S. PATENT DOCUMENTS

| | | |
|---|---|---|
| 8,996,159 B2 | 3/2015 | Franzen et al. |
| 11,040,839 B2 * | 6/2021 | Wieschemann ...... G05D 1/0289 |

(Continued)

FOREIGN PATENT DOCUMENTS

| | | |
|---|---|---|
| CN | 1733570 | 2/2006 |
| CN | 101525041 | 9/2009 |

(Continued)

OTHER PUBLICATIONS

International Search Report and Written Opinion of the International Searching Authority from corresponding Patent Cooperation Treaty (PCT) Application No. PCT/EP2018/074792, dated Jan. 7, 2019.

(Continued)

*Primary Examiner* — Kaitlin S Joerger
(74) *Attorney, Agent, or Firm* — Gardner, Linn, Burkhart & Ondersma LLP

(57) ABSTRACT

A method, system, and terminal are provided for controlling travel of transport vehicles within a transfer zone. The transfer zone connects an automatic region for automatically guided transport vehicles to a manual region for manually guided transport vehicles. The transport vehicles travelling through the transfer zone in order to deliver or pick up containers in the transfer zone are granted or refused autho- (Continued)

rization to enter the transfer zone in order to travel through the transfer zone. In the absence of granted authorization for entry of a manually guided transport vehicle into a transfer region of the transfer zone, an intervention is automatically implemented in a controller of the transport vehicle in such a way that at least full entry, but optionally even partial entry, to the transfer zone is prevented.

20 Claims, 3 Drawing Sheets

(56) References Cited

U.S. PATENT DOCUMENTS

| | | | |
|---|---|---|---|
| 2006/0073002 A1 | 4/2006 | Koide | |
| 2014/0017046 A1 | 1/2014 | Wieschemann et al. | |
| 2014/0255130 A1* | 9/2014 | Pierangelino | B65G 63/004 |
| | | | 414/803 |
| 2020/0102162 A1* | 4/2020 | Wieschemann | B65G 65/005 |
| 2020/0156627 A1* | 5/2020 | Wieschemann | B60W 10/18 |
| 2020/0307924 A1* | 10/2020 | Wieschemann | G08G 9/00 |
| 2021/0316953 A1* | 10/2021 | Schweizer | B65G 63/004 |

FOREIGN PATENT DOCUMENTS

| | | | | |
|---|---|---|---|---|
| CN | 104108610 | | 10/2014 | |
| CN | 106946049 | | 7/2017 | |
| DE | 10322765 | | 1/2005 | |
| DE | 102004035856 | | 3/2005 | |
| DE | 102010060504 | | 5/2012 | |
| DE | 102011001847 | | 10/2012 | |
| DE | 102012009297 | | 12/2012 | |
| DE | 102016111450 A1 * | 12/2017 | B65G 63/004 |
| DE | 102017121496 A1 * | 3/2019 | B65G 63/004 |
| EP | 2637954 | | 9/2011 | |
| EP | 3681831 B1 * | 6/2021 | B65G 63/004 |
| JP | 2975594 | | 9/1999 | |
| JP | 2005225662 | | 8/2005 | |
| JP | 2005239314 | | 9/2005 | |
| WO | 2011054856 | | 5/2011 | |
| WO | 2012062807 | | 5/2012 | |

OTHER PUBLICATIONS

International Preliminary Examination Report with translation from corresponding Patent Cooperation Treaty (PCT) Application No. PCT/EP2018/074792, dated Jan. 8, 2020.

* cited by examiner

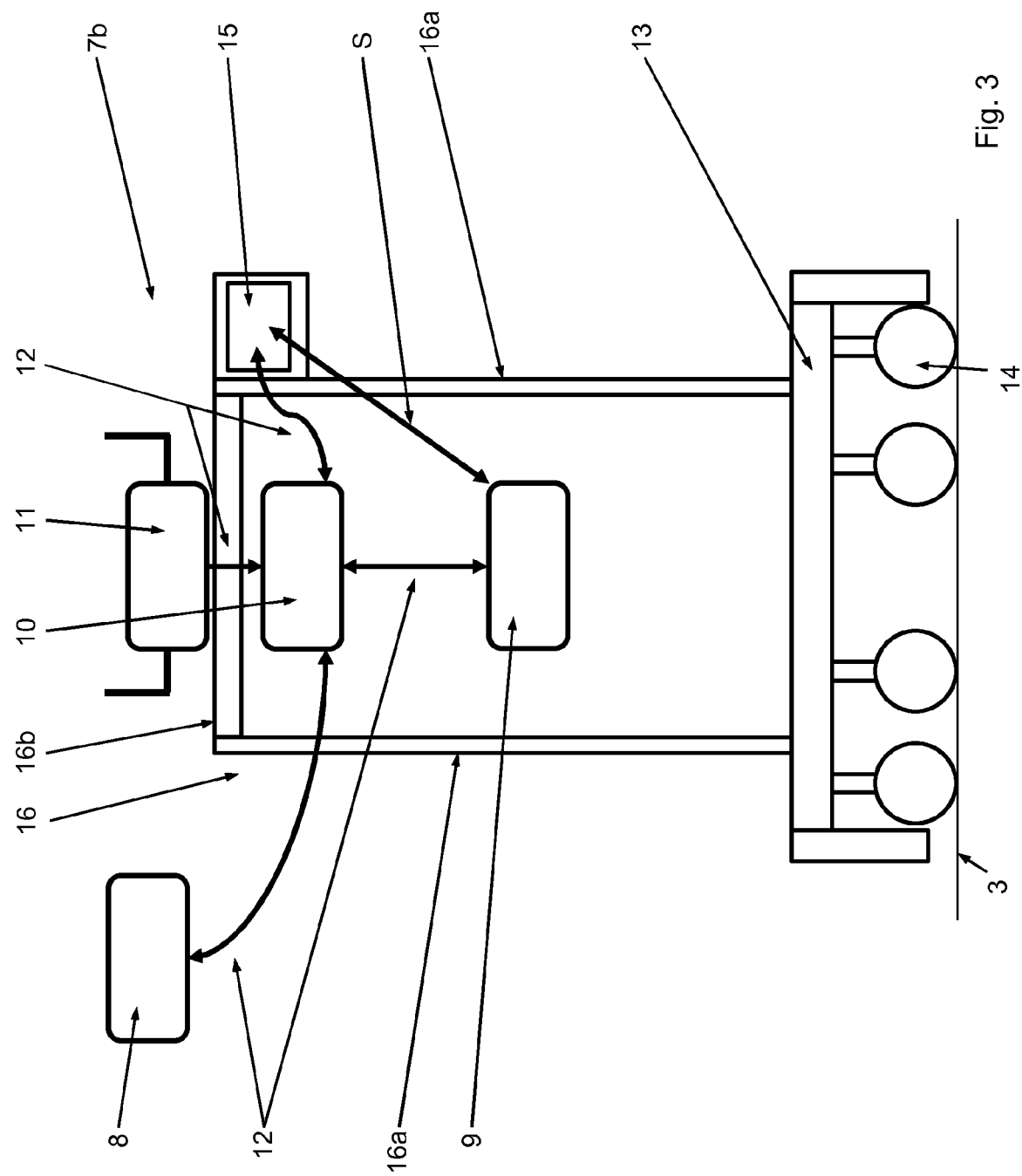

METHOD FOR CONTROLLING TRAVEL WITHIN A TRANSFER ZONE FOR CONTAINERS OF TRANSPORT VEHICLES IN A TERMINAL FOR CONTAINERS, CONTROL SYSTEM FOR SAME, AND TERMINAL COMPRISING A CONTROL SYSTEM OF THIS KIND

CROSS REFERENCE TO RELATED APPLICATIONS

The present application is a § 371 national stage of International Application PCT/EP2018/074792, filed Sep. 13, 2018, which claims priority benefit of German Pat. Application DE 10 2017 121 496.8, filed Sep. 15, 2017, both of which are hereby incorporated herein by reference in their entireties.

FIELD OF THE INVENTION

The invention relates to a method, a control system, and a handling plant for controlling travel of transport vehicles for containers within a transport zone.

BACKGROUND

Transport vehicles for containers such as gantry lift devices are known from DE 10 2011 001 847 A1, for example. Such gantry lift devices are also referred to as gantry lift trucks, gantry lift stackers, gantry lift stacker trucks, gantry stacker trucks, straddle carriers, van carriers, shuttle carriers, sprinter carriers or runners. Gantry lift devices conventionally include a spider leg-like structure with a lifting device, by means of which a load picking-up means, designated as a spreader or spreader frame, can be raised and lowered in order to be able to pick up and raise containers and then place and thus set them down at a target location after transportation. At their upper end, for this purpose, four gantry struts are conventionally connected to one another via a top frame to form a U-shaped gantry frame, which is open at the bottom and is supported by the gantry struts, and on which the lifting device is arranged. By means of the spider leg-like structure of the gantry frame that has the four rigid gantry struts arranged in the corners of a notional rectangle, gantry lift devices can travel over a container resting on the ground, or on another container, or along the length of a container row and thus additionally also transport a raised container depending on the design. Depending upon the construction height, the gantry lift devices are designated, for example, as 1-over-3 devices, 1-over-2 devices, etc. A 1-over-3 device can move with a picked-up container over three stacked containers without colliding with them, can set a container down onto three stacked containers or can pick up the uppermost of four stacked containers.

Gantry lift devices and also the other transport vehicles described in conjunction with the present invention can also travel freely on a ground surface on wheels and are thus floor-bound, but not rail-bound. Accordingly, the transport vehicles are to be distinguished from rail vehicles and in particular railway wagons. The wheels of the transport vehicles are each provided with a tire arrangement that is optionally an air-filled rubber tire arrangement in the sense of tires. Moreover, each of the transport vehicles includes a travel drive having a motor configured, for example, as an electric motor or internal combustion engine, and a transmission in order to drive the wheels thereby.

Furthermore, corresponding transport vehicles can be guided manually and can be actively controlled accordingly, in particular during acceleration, braking and steering, by drivers typically also travelling in the vehicles. For this purpose, manually guided transport vehicles have a corresponding vehicle controller and typically also a driver's cab, from which manual intervention of the vehicle controller can be effected for the purpose of manual guiding. Alternatively, the transport vehicles can also be automatically guided and can be controlled in an automated manner accordingly, in particular during acceleration, braking and steering, as so-called automated guided vehicles (AGV). For this purpose, automated guided transport vehicles have a suitable vehicle controller and so, by reason of the automatic control or navigation effected thereby, it is not necessary or possible for a driver also travelling in the vehicle to perform any active manual intervention. In this sense, an automated guided transport vehicle can also be manned if a driver also passively travels in the vehicle, but in this case not in the sense of having to or being able to actively intervene in the control of the transport vehicle as a vehicle driver. Transport vehicles that are driverless but are manually remote-controlled by a vehicle driver are not deemed to be automated guided vehicles, but instead are deemed to be manually guided vehicles.

Typical areas of usage for transport vehicles, and in particular gantry lift devices for use in the handling and transportation of containers, in particular standardized ISO containers, within handling plants designed as a terminal in sea ports, or inland ports, or in handling plants for combined road and rail traffic. These transport vehicles are special vehicles designed as heavy-duty vehicles that are operated only internally within such terminals as internal transport vehicles and are generally not authorized for use on public roads. Therefore, the internal transport vehicles are to be operated strictly separately from vehicles on public roads.

The gantry lift devices in the present case are also to be distinguished from container stacking cranes, and in particular from so-called rubber tire gantry cranes (RTG), the horizontal crane girder of which spans two or more rows of containers. In order to pick up or set down containers from/in a container row, the lifting device of such stacking cranes is moved along the crane girder over the desired container row by means of a crane trolley, and then the load picking-up means is lowered/lifted by means of the lifting device. In contrast to the situation in the above-mentioned gantry lift devices, the lifting device in corresponding stacking cranes is not stationary between the gantry struts in terms of its horizontal position but is movable via the crane trolley in the horizontal direction, and thus in the horizontal direction relative to the gantry struts. A gantry lift device, also referred to as a straddle carrier, does not include a corresponding crane trolley.

Handling plants for containers, in particular ISO containers, are known, for example, from EP 2 637 954 B1. An automated area and a manual area are arranged in the handling plant. Exclusively automated guided internal transport vehicles for containers may be operated in the automated area and exclusively manually guided internal transport vehicles may be operated in the manual area. The transport vehicles transport containers between container bridges and a container store in the automated area and in the manual area.

Handling plants are also known, in which a transfer zone having a transfer area for containers is arranged between an automated area and the manual area, into which transfer zone and from which transfer zone automated guided and manually guided gantry lift devices alternately travel and set down, in particular place, and pick up containers in the transfer area. "Transfer" is thus understood to mean not only a direct transfer and reception of a container between two transport vehicles that are located in the transfer area at the same time such that unloading of the transport vehicle delivering a container has to be directly and immediately associated with the loading of the transport vehicle that picks up or receives the container. Rather, a "transfer" in this sense also allows the placing of the container outside of a transport vehicle, before the container is then picked up by another transport vehicle and thus this transport vehicle is loaded with the container. Such a transfer area could thus also be referred to as a "loading/unloading area", which is used at different times by automated guided transport vehicles and also manually guided transport vehicles, and in particular gantry lift devices.

In order to prevent a manually guided transport vehicle and an automated guided transport vehicle from entering the transfer area at the same time and to prevent a collision therebetween, physical access restrictions and barriers, such as gates incorporated in a fence, are provided—in particular for the manually guided vehicles—that can be opened or closed accordingly in order to grant or deny authorization to enter the transfer area.

DE 103 22 765 A1 relates to an automatic forwarding agent's yard. Heavy-goods vehicles are operated in a remote-controlled manner in the forwarding agent's yard and are operated manually by drivers, travelling in the vehicle, outside of the forwarding agent's yard.

DE 10 2012 009 297 A1 and DE 10 2004 035 856 A1 each relate to assisting drivers who operate vehicles manually on public roads.

SUMMARY OF THE INVENTION

Aspects of the present invention provide a method, control system, and handling plant for controlling travel in a transfer zone for containers by container transport vehicles, in particular gantry lift devices. In accordance with one aspect of the invention, the transfer zone connects an automated area for automated guided transport vehicles to a manual area for manually guided transport vehicles and the transport vehicles travel in the transfer zone in order to set down or pick up containers in the transfer zone. An authorization to enter the transfer zone is granted or denied to the transport vehicles to travel in the transfer zone by virtue of the fact that in the absence of a granted authorization for a manually guided transport vehicle, in particular a gantry lift device, to enter the transfer zone, intervention in a vehicle controller of this transport vehicle automatically occurs such that at least complete entry, but optionally even partial entry, into the transfer zone is prevented. In other words, intervention in the vehicle controller is only prevented when authorization to enter was granted to the respective transport vehicle. Otherwise, in particular in the case of denied authorization or in the absence of requested authorization, entry is prevented by the intervention. In this case, at least complete entry, but optionally even partial entry, into the transfer zone can be prevented. If the transport vehicle is a gantry lift device, it is optionally a straddle carrier.

Whereas authorization to enter transfer zones is controlled conventionally by means of physical access restrictions such as gates, these can be omitted owing to the method in accordance with the present invention. This is advantageous because the use of physical access restrictions such as fences, barriers, gates etc. is associated with a very high financial investment, in particular when the transfer zones extend over large areas within a handling plant. The present invention allows the transfer zone to be designed without barriers, and thus there is only a small financial investment, for example, for a set of traffic lights associated with this, and despite this an interaction of manual and automated transport vehicles such as gantry lift devices can be guaranteed. As a result, larger transfer zones with numerous transfer areas are also made possible, without having to install physical access restrictions such as barriers for this purpose. Already installed access restrictions can also be removed in order to be able to define additional transfer areas and accordingly to be able to operate same safely. This results in a higher handling capacity with a lower infrastructure outlay. It is hereby considerably simpler to combine manual and automated transport capacities, in particular horizontal transport of containers in handling plants. In particular, successive automation of the horizontal transport in handling plants is thereby facilitated.

In an advantageous manner, provision is made that the intervention in the vehicle controller occurs when the transport vehicle approaches the transfer zone with a critical movement profile without having obtained a granted authorization to enter a transfer area of the transfer zone. This applies in particular when an authorization to enter was denied or authorization was not requested by the transport vehicle. For critical or non-critical movement profiles, settings can be defined and stored and a corresponding intervention can occur when a critical movement profile of the transport vehicle is recognized and the transport vehicle has not obtained granted authorization to enter the transfer zone. A critical movement profile may accordingly be present when the transport vehicle is moving too quickly and/or too close to the transfer zone in a direction of travel directed towards the transfer zone.

In order to effectively prevent entry into the transfer zone, provision is made that the intervention in the vehicle controller, when then occurs automatically, includes setting a speed limit for the transport vehicle. As a result, the transport vehicle can be braked until it stops if need be.

Provision can advantageously be made that a transfer area of the transfer zone, which connects the automated area to the manual area, is defined such that it includes at least part of a first lane of the transfer zone and extends over at least portions, optionally half, of two further adjacent lanes that adjoin the first lane on the long and mutually opposite side, and connect the automated area to the manual area. This represents a particularly safe definition of a transfer area. However, the transfer area can also be defined with a smaller minimum surface area.

The safety of the method is further increased by virtue of the fact that a request by a transport vehicle is necessary in order to obtain authorization to enter the transfer zone and in particular a transfer area of the transfer zone. In this manner, requests and authorizations granted thereupon can be processed as described below in order to reliably prevent collisions in the transfer zone. In the absence of a corresponding request, authorization to enter is not granted and so intervention in the vehicle controller may be necessary as described above.

In order to avoid collisions, provision is also made that authorization to enter a transfer area of the transfer zone is granted if the transfer area is in a neutral state of readiness, and the authorization to enter the transfer area is denied if the transfer area is blocked at least partially for another transport vehicle. In order to be in a neutral state of readiness, the requested desired transfer area, i.e. the associated complete lanes and/or portions thereof, may not be blocked identically or partially for the entry of another transport vehicle. In particular, another gantry lift device must not be located in the transfer area.

Even if the entire transfer zone is in the neutral state of readiness, but the driver of a manually guided transport vehicle with a critical movement profile is attempting to enter the transfer zone without a request for authorization to enter a transfer region of the transfer zone being triggered or a request was triggered but authorization to enter was not granted, intervention in the vehicle controller occurs.

In an advantageous manner, provision can additionally be made that authorization to enter a transfer area of the transfer zone is granted for two transport vehicles, of which one transport vehicle is manually guided and one transport vehicle is guided in an automated manner, one after the other in order to set down or pick up a container for transport from the automated area to the manual area or vice-versa. As described in more detail below, authorization to enter must likewise be granted for the automated guided transport vehicle because otherwise automatic intervention in the vehicle controller thereof occurs in the same manner in order to prevent complete or partial entry into the transfer zone if the transport vehicle approaches the transfer zone without granted authorization.

Another aspect of the present invention provides a control system for controlling travel in a transfer zone for containers by transport vehicles for containers, in particular gantry lift devices, in which the transfer zone connects an automated area for automated guided transport vehicles to a manual area for manually guided transport vehicles and the transport vehicles travel in the transfer zone in order to set down or pick up containers in the transfer zone. The control system is configured to grant or deny authorization to enter the transfer zone to the transport vehicles to travel in the transfer zone by virtue of the fact that the control system is configured to perform the above-described method in accordance with the present invention and thus, in the absence of a granted authorization for a manually guided transport vehicle, in particular a gantry lift device, to enter the transfer zone, to effect intervention in a vehicle controller of the transport vehicle automatically such that entry into the transfer zone is prevented. By means of the control system, at least complete entry, but optionally also partial entry, into the transfer zone can thus likewise be prevented when there is no corresponding authorization to enter.

In a structurally simple manner, provision is made that the control system includes a safety controller and a vehicle controller of the transport vehicle, in particular an automated guided or manually guided gantry lift device, and the safety controller of the transport vehicle cooperates with the vehicle controller in order to effect intervention in the vehicle controller in the absence of granted authorization to enter. Optionally, each transport vehicle incorporated in the control system includes such a safety controller, which is incorporated in the control system via communication connections.

Furthermore, provision is advantageously made that the control system includes a central safety controller in order to grant or deny authorization to enter the transfer zone and in particular a transfer area of the transfer zone upon request by the transport vehicle. The central safety controller cooperates accordingly with the respective safety controller in the vehicles.

Both safety controllers may be formed as fail-safe programmable logic controllers. Corresponding controllers are also referred to as PLCs (programmable logic controllers) or Failsafe PLCs or F-PLCs.

In an advantageous manner, provision is also made that the control system includes a position detection system for each transport vehicle to be involved in the control system, in order to recognize when the corresponding transport vehicle approaches the transfer zone and/or a transfer area defined in the transfer zone with a critical movement profile. By means of the position detection system attached to the respective transport vehicle or gantry lift device, e.g. an actual movement profile can thus be determined and used to recognize a critical movement profile. The position detection system can be based e.g. on transponder, GPS or radio location technology and the positional data determined thereby can be validated, for example, by means of odometry.

Another aspect of the present invention provides a handling plant for containers having a transfer zone for containers that connects an automated area for automated guided transport vehicles to a manual area for manually guided transport vehicles by virtue of the fact that the handling plant includes a corresponding control system. The control system can be incorporated in a management system of the handling plant as described below in order to safely coordinate the horizontal transport in particular in the transfer zone so as to avoid collisions. In an advantageous manner, provision can be made that at least one transfer area can be defined in the transfer zone, which transfer area is formed without any barriers in the above sense at its boundaries to the automated area and to the manual area. In such a handling plant, there is thus in particular no need to install any barriers used as physical access restrictions, such as fences or gates. These can also be successively removed in order to define additional transfer areas and as a result to be able to increase the handling capacity of a handling plant.

These and other objects, advantages and features of the invention will become apparent upon review of the following specification in conjunction with the drawings.

BRIEF DESCRIPTION OF THE DRAWINGS

An exemplified embodiment of the invention will be explained in greater detail with reference to the following description. In the figures:

FIG. 3 shows a diagram illustrating the function of a gantry lift device incorporated in the control system in accordance with the invention.

DESCRIPTION OF THE PREFERRED EMBODIMENTS

Figure 1:
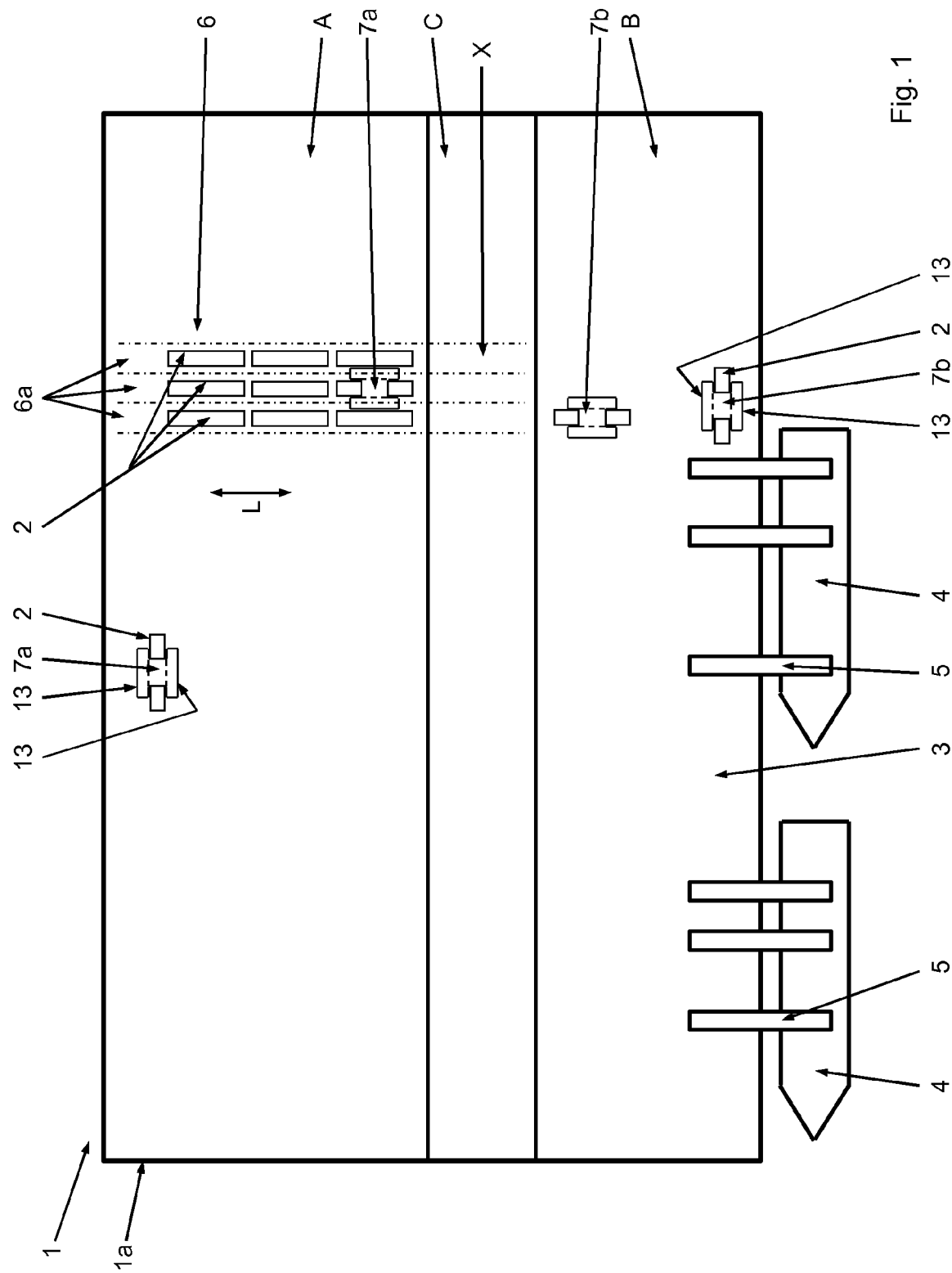
FIG. 1 shows a schematic plan view of part of a handling plant for containers.

FIG. 1 shows a schematic plan view of part of a handling plant 1 for containers 2 in a port. In this case, ships 4 can dock at a quay 3 of the port in order to deliver or collect containers 2. In order to load or unload the ships 4, the quay 3 is provided with container bridges 5, which are also defined as ship-to-shore cranes and of which the jibs extend, on the one hand, over the ships 4 and, on the other hand, above the quay 3. Alternatively, the loading or unloading of the ships 4 can also be performed using so-called wharf cranes, of which the jib is pivoted in this case over the corresponding ship 4 about a vertical axis. Both the container bridges 5 and the wharf cranes represent so-called handling devices.

The containers 2 can weigh up to 40 t in the loaded state and can have normed or at least standardised lengths of for example, 10, 20, 40, 45, 53 or 60 foot. In this case, the containers 2 can be designed as ISO containers and can have normed corner fittings. The two last-named lengths have hitherto been used exclusively in North America as non-ISO-normed containers. In this regard, ISO containers are understood to be normed large-volume or sea-freight containers that are used in the international transportation of goods. However, the containers 2 can also be other normed or at least standardised load carriers, such as, for example, swap bodies, in particular swap containers or swap trailers.

The handling plant 1 is designed as a terminal or port terminal and accordingly is surrounded by a boundary 1a that, in the form of, for example, a fence or wall, extends to the edge of the quay 3. As a result, the handling plant 1 is separated from the outside surrounding area and from public roads outside the terminal. As an essential component, the handling plant 1 includes, within the boundary 1a, a store 6 in which containers 2 can be placed for intermediate storage and in particular can be stacked in stacks. This occurs after they have been unloaded from the ships 4 and before they are loaded for further transportation outside the handling plant 1 onto an external transport vehicle or rail vehicle or after they have been delivered thereby and before they are loaded onto the ships 4. The store 6 includes storage areas 6a in rows that extend along or in parallel with a longitudinal direction L, a plurality of which are arranged in parallel with each other and spaced apart from each other by narrow aisles. The containers 2 can be stacked in the storage areas 6a, such that the containers 2 are oriented with their longitudinal extension in parallel with the longitudinal direction L. This produces an arrangement of the stacks in the form of rows and/or in a grid pattern within the store 6, as can be seen in FIG. 1.

In order to transport containers 2 between the handling devices arranged on the quay 3 and the store 6 in a so-called horizontal transport, and then to stack or de-stack the containers in the store 6, automated guided gantry lift devices 7a and manually guided gantry lift devices 7b (see also FIG. 3) are used within the handling plant 1 as internal transport vehicles for the containers 2 in terms of the above definition. The gantry lift devices 7a, 7b, also referred to as straddle carriers, are thus used for horizontal transport outside the store 6, and also for managing the store 6, i.e. for placing the containers 2 into storage and removing the containers 2 from storage by stacking and de-stacking in the store 6.

For this purpose, the gantry lift devices 7a, 7b each have a structure formed in the sense described in the introductory part of the description having two running gear unit supports 13 arranged next to each other and spaced apart from each other transverse to their longitudinal extension at least by the width of an ISO container. The running gear unit supports 13 are oriented with their respective longitudinal extension in parallel with one another. In the side view of FIG. 3, only one of the two running gear unit supports 13 can be seen and the other one is concealed thereby. However, the spacing between the two running gear unit supports 13 is smaller than the overall width of two ISO containers located with their longitudinal sides next to one another, and so the gantry lift devices 7a, 7b cannot move over two ISO containers located next to one another accordingly, unlike a container stacking crane. A plurality of steerable wheels 14 are attached to each running gear unit support 13 in the sense of the above definition (see FIG. 3). The gantry lift devices 7a, 7b can thus travel freely and are not rail-bound. The running gear unit supports 13 also have electric travel drives and electric steering motors for the wheels 14 that are powered by a drive unit of the gantry lift device 7a, 7b. Depending on the drive technology used (diesel-electric, diesel-hydraulic or fully electric), the drive unit includes components such as, for example, a diesel engine and generator, batteries and/or hydraulic assemblies. By reason of the single-wheel steering provided, it is possible to carry out different steering programs, such as e.g. optimised type curve travel, circular travel, rotation about its own vertical axis or backwards movement, by a vehicle controller 9.

A U-shaped gantry frame 16, as described in the introductory part of the description, is supported on the running gear unit supports 13, the top frame 16b of which is supported by four gantry supports 16a, of which likewise only the front two can be seen. A load picking-up means in the form of a spreader for containers 2 can be vertically raised and lowered by means of a lifting device between the two running gear unit supports 13 and below the top frame 16b. By means of the spreader, containers 2 can be picked up, raised, transported, lowered and placed and can be stacked or de-stacked. The lifting device is additionally arranged in a stationary manner in relation to the gantry supports 16a in its horizontal position between the gantry supports 16a, and so in the absence of a crane trolley, the lifting device and the load picking-up means have to be positioned above the desired storage space or the desired container, in particular in a desired container row, solely by way of suitably manoeuvring the gantry lift device 7a, 7b, in order to pick up or place containers 2 at that location.

By way of this structure, the gantry lift devices 7a, 7b with the spreader frame raised accordingly can move in the longitudinal direction L along the storage areas 6a and over the stacks of containers 2 or container rows formed therein, wherein one of the running gear unit supports 13 of the gantry lift device 7a, 7b is arranged on the right and the other running gear unit support 13 is arranged on the left of containers 2 being travelled over in the aisle formed at that location. Portions, optionally half, of each running gear unit support 13 is/are located in the two mutually adjoining storage areas 6a as seen in the direction of the longitudinal extension thereof. The containers 2 of the container row, over which the gantry lift device 7a, 7b travels, such as centrally, are then arranged between the running gear unit supports 13 and the corresponding gantry supports 16a. For such travel through the store 6, the internal transport vehicles and thus also the gantry lift devices 7a, 7b receive transport orders and/or travel routes planned by a management system of the handling plant 1.

The travel routes to be travelled for processing the transport orders are automatically performed by the automated guided gantry lift devices 7a and coordinated by means of the management system. The vehicle controller 9 of the automatically navigated gantry lift devices 7a cooperates with the management system such that the travel routes are automatically converted by control technology into corresponding driving manoeuvres. This also includes the actuation of the corresponding drives, in particular travel drives, steering motors and lifting drives of the lifting device for the spreader, and brakes, which are required for the steering programs or steering processes, speeds and accelerations and actions of the spreader.

In the case of manually guided gantry lift devices 7b, manual intervention of a driver in the vehicle controller 9 is required for this purpose. This typically occurs in a driver's cab 15 in which corresponding control means for manual intervention in the vehicle controller 9 are provided and send control signals to the vehicle controller 9, or exchange the control signals therewith, via a wireless or wired control line S. Corresponding control means for manual intervention in the vehicle controller 9 and the driver's cab 15 do not need to be provided in the automated guided variant.

The handling plant 1 includes, within the boundary 1a, an automated area A and a manual area B. In the automated area A, only automated guided internal transport vehicles, such as the gantry lift devices 7a, may be operated for horizontal transport. In the manual area B, only manually guided internal transport vehicles, such as the gantry lift devices 7b, may be operated for horizontal transport.

In the present exemplified embodiment, the store 6 is arranged completely in the automated area A and is thus managed automatically by the automated guided gantry lift devices 7a. The handling devices on the quay 3 are arranged, in contrast, in the manual area B and so for the transport of containers 2 between the store 6 and the handling devices on the quay 3, a transfer between the automated guided gantry lift devices 7a and the manually guided gantry lift devices 7b has to occur.

Alternatively or in addition, it is also feasible that on the one hand at least part of the store 6 is arranged in the manual area B and on the other hand the automated area A extends as far as the quay 3, and so automated guided transport vehicles can also collect containers 2 from the handling devices at that location, or can deliver containers thereto. The handling devices can also be operated manually because they are not used for horizontal transport. In this case, for the transport of containers 2 between the handling devices in the automated area A and the part of the store 6 arranged in the manual area B, a transfer between the automated guided gantry lift devices 7a and the manually guided gantry lift devices 7b must likewise occur.

In order to permit such transfers of containers 2, a transfer zone C is arranged between the automated area A and the manual area B. The transfer zone C optionally includes a plurality of defined transfer areas X, X1, X2 for containers 2, in which a gantry lift device 7a or 7b can travel in parallel, i.e. at the same time.

Figure 2:
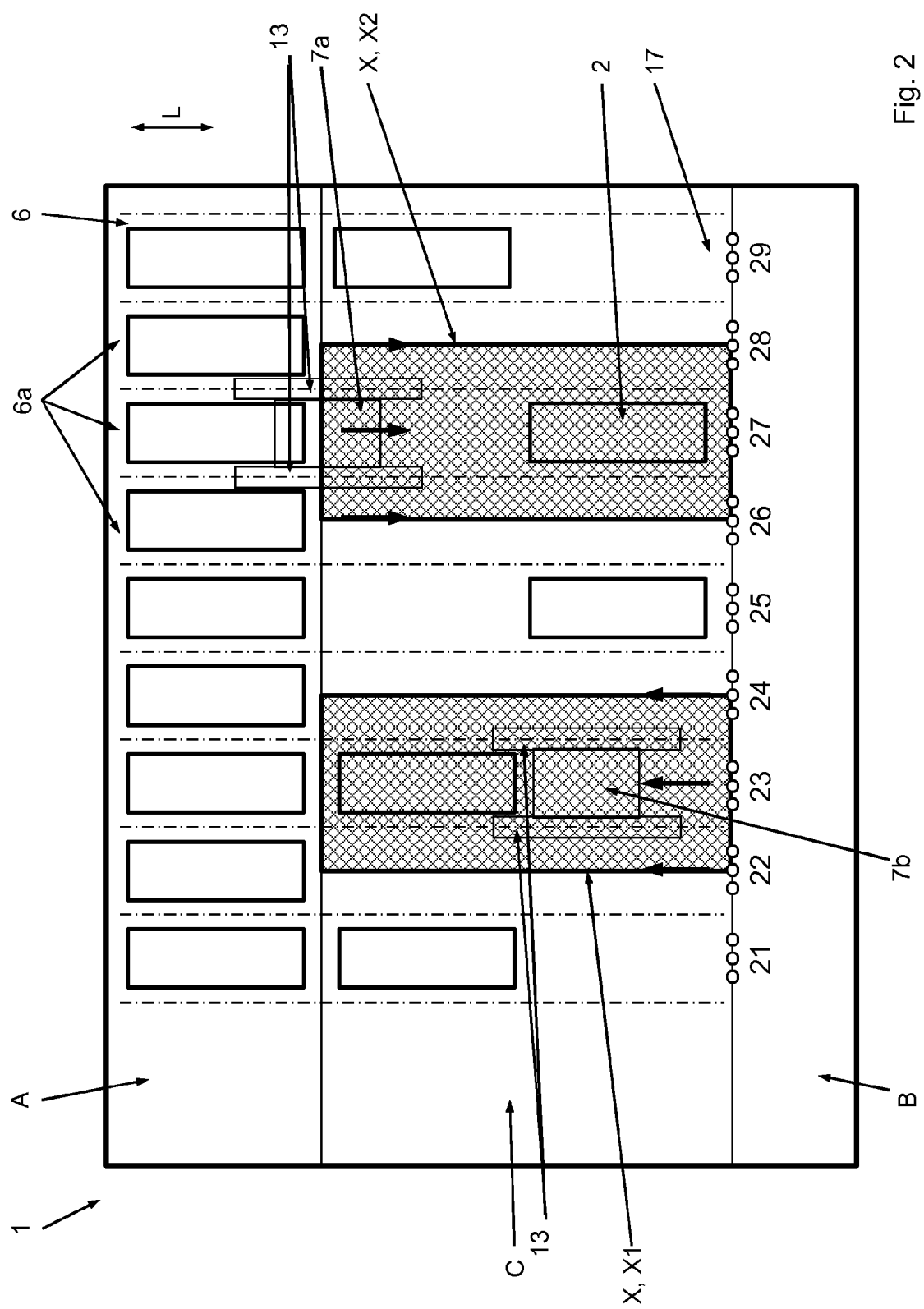
FIG. 2 shows an enlarged section of a transfer zone of the handling plant of FIG. 1 with two blocked transfer areas for gantry lift devices.

FIG. 2 shows an enlarged section of the transfer zone C of the handling plant 1 of FIG. 1 having two transfer areas X1 and X2 for containers 2, of which the transfer area X1 is defined and blocked for a manually guided gantry lift device 7b and the transfer area X2 is defined and blocked for an automated guided gantry lift device 7a. The transfer zone C is divided into several adjacent lanes 21 to 29 that extend between the automated area A and the manual area B and are each arranged aligned with one of the storage areas 6a in the automated area A. In the present case, the transfer area X1 includes the lane 23 in the center and at least portions, in particular half, of the lanes 22 or 24 adjoining thereto directly on their mutually opposite longitudinal sides. The transfer area X2 spaced apart from the transfer area X1 includes the lane 27 in the center and at least portions, in particular half, of the lanes 26 or 28 adjoining thereto directly on their mutually opposite longitudinal sides. The lanes 21 to 29 are provided with floor markings and are numbered with the numbers accordingly at least in the area of the manual area B for improved orientation for the drivers of the manually guided gantry lift devices 7b. The longitudinal sides, illustrated as dashed lines, of the lanes 21 to 29 and storage areas 6a can also be provided with floor markings on the ground of the handling plant 1.

The transfer zone C and the transfer areas X, X1, X2 that can be defined therein have an interface function between the automated area A and the manual area B. On the one hand, this ensures a strict separation in relation to the traffic of the two adjoining areas A, B, but on the other hand, this permits an open connection in relation to the flow of piece goods of containers 2, the connection permitting the necessary transfer of containers 2. In order to permit the flow of piece goods of containers 2 between the automated area A and the manual area B, the internal transport vehicles designed, for example, as gantry lift devices 7a, 7b, only alternately can enter the transfer zone C, or a transfer area X, X1, X2 at that location from one of the two areas A, B for a transfer in the sense defined above, and at that location set down, in particular place, or pick up containers 2 for transfer. Then, the respective gantry lift device 7a, 7b must leave the transfer area X, X1, X2 back towards its original area A or B. Accordingly, manually guided transport vehicles must not enter the automated area A from the transfer zone C or the transfer areas X, X1, X2 defined therein and automated guided transport vehicles must not enter the manual area B therefrom. This is applicable for regular handling and transporting operation and in particular the setting down or placing and picking-up of containers 2 occurring therein. An exception thereto is any crossover of transport vehicles between the areas A, B for maintenance or repair, which is not deemed to be regular handling and transporting operation. In this context, people may also remain in the automated area A by way of exception. Otherwise, this is possible at most as a passive driver of an automated guided transport vehicle. The transfer zone C with the transfer areas X, X1, X2 therein thus forms the only area within the boundary 1a, in which automated guided and manually guided internal transport vehicles may travel within the context of regular handling and transporting operation.

In order for the automated guided and manually guided gantry lift devices 7a, 7b to be able to travel in the transfer zone C for transfer, i.e. for setting down, in particular placing, and picking-up a container 2 without any collisions, a method in accordance with the invention for controlling travel in the transfer zone C is performed as described hereinafter by means of a control system in accordance with the invention (see FIG. 3) suitable for performing this method for controlling travel in a corresponding transfer zone C. This method will initially be explained by way of example in conjunction with a manually guided gantry lift device 7b travelling in the transfer area X1, and then in conjunction with an automated guided gantry lift device 7b travelling in the transfer area X2.

The manually guided gantry lift device 7b receives a transport order from the management system of the handling plant 1 that requires travel in the lane 23 of the transfer zone C in terms of a journey taking place within the lane 23 in order to, for example, pick up a container 2 at that location and to transport it to a container bridge 5 in the manual area B. The following statements apply similarly if the gantry lift device 7b is intended to travel in the lane 23 in order to place a container 2 at that location, which container is then intended to be picked up by an automated guided gantry lift device 7a and placed into storage in the store 6, in particular the storage area 6a adjoining the lane 23 in the longitudinal direction L, in the automated area A. For this purpose, the gantry lift device 7b is manoeuvred in each case by its driver through the manual area B in the direction of the lane 23.

However, travel in the lane 23 within the transfer zone C is only possible when an authorization to enter the transfer area X1 is granted for the gantry lift device 7b, which area is associated with the lane 23 and includes the lane 23. The transfer area X1 is produced by virtue of the fact that the lane 23 is intended to be travelled in according to the transport order and at least portions, optionally half, of the adjacent lanes 22 and 24 adjoining thereto on the right and left are defined as part of the transfer area X1 in addition to the lane 23. In this manner, all the transfer areas X, X1, X2 can be defined in a variable manner within the transfer zone C depending upon which of the lanes 21 to 29 are meant to be travelled in for setting down or picking up a container 2 at that location. Owing to the incorporation of at least parts or portions of the adjacent lanes 22 and 24, collisions with any other gantry lift devices 7a, 7b travelling into or out of the transfer zone C, in particular in the center of the lane 21 or 25, can be avoided in a particularly reliable manner. The lane 23 is dimensioned, such that at least one gantry lift device 7a, 7b including a picked-up container 2 can be located in the center of the lane 23 when travelling in the lane 23, within typical tolerance ranges, where the longitudinal extensions of the running gear unit supports 13 and the lane 23 are oriented in parallel with each other. As seen in the plan view of FIG. 2, portions, optionally half, of the running gear unit supports 13 of the gantry lift device 7b, illustrated by way of example, protrude into the lane 22 or 24 that is adjacent on the left or right respectively. Accordingly, as seen in the plan view of FIG. 2, the boundaries of the lane 23, illustrated in dashed lines, may also coincide with the center of the respective running gear unit support 13. In this case, the running gear unit supports 13 are then also oriented, as seen along their longitudinal extension, within the respective aisle, optionally in the center thereof, that adjoins the storage area 6a associated with the lane 23. Therefore, the running gear unit supports 13 can travel through these aisles without any collisions when travelling over this storage area 6a. The other lanes of the transfer zone C are dimensioned identically.

As a minimum surface area, a transfer area X, X1, X2 includes the vertical projection surface of a gantry lift device 7a or 7b with a picked-up container 2. The surface area additionally defined as part of the transfer area X, X1, X2, and thus also the adjacent lanes, at least portions of which are included in the present case, thus represent a type of safety portion of the transfer area X, X1, X2.

Authorization to enter the transfer area X1 to travel in the lane 23 is granted only in response to a corresponding active authorization request. In this regard, the request is triggered automatically by a safety controller 10 of the gantry lift device 7b as to whether authorization to enter the lane 23, or a transfer area X, X1, X2 allocated to the lane 23, is granted. The request is triggered on the basis of the transport order specified by the management system or the associated travel route when it leads into the transfer zone C or one of the lanes at that location. The associated transfer area X1 is also automatically determined or defined according to the above-described criteria by the safety controller 10 for the request. The safety controller 10, and in particular also the associated gantry lift device 7b, is thus part of the control system. The request with the desired transfer area X1 is then sent to a central and in particular stationary safety controller 8 of the control system via a communication connection 12. The safety controller 8 has a computing unit for this purpose. Moreover, the safety controller 8 stores and processes the already granted authorizations and the positional data of the associated currently defined transfer areas X, X1, X2 of the transfer zone C and the gantry lift devices 7a, 7b allocated for this purpose, for which the transfer area X, X1, X2 is currently blocked. In addition, the safety controller 8 processes new requests and grants or denies authorization to enter the transfer zone C or transfer areas X, X1, X2 defined therein. In this regard, in the present example the safety controller 8 checks whether the determined transfer area X1 is free or is already reserved and thus blocked. By incorporating the lane 23 in the transfer area X1, not only is the lane 23 blocked, but so is half of the lanes 22 and 24. The transfer area X1 is accordingly blocked if at least one of the associated portions of the lanes 22 to 24 is part of another defined transfer area X for which authorisation to enter was already granted, which authorization is still valid. The then denied authorization to enter is sent to the safety controller 10 of the gantry lift device 7b in response to the authorization request and can be signalled to the driver by a display in the driver's cab 15 or also by a set of traffic lights 17. If authorization is denied for a driver by corresponding signalling, a new request at a later point in time is necessary. This occurs automatically and periodically via the safety controller 10 until the corresponding authorization is granted.

If the driver—despite the denied authorization and thus without granted authorization—attempts to enter a reserved or blocked transfer area X, X1, X2, e.g. the lane 23, automatic intervention in the vehicle controller 9 occurs via the safety controller 10 such that at least complete entry and thus also complete travel in the lane 23 and entry into the automated area A is prevented. Partial entry can also be prevented. In this context, positional data of the gantry lift device 7b are continuously compared with the stored positional data of the transfer areas X, X1, X2 that are defined and thus blocked for other gantry lift devices 7a, 7b. In this regard, the gantry lift devices 7b have, in addition to the safety controller 10, a position detection system 11 that is incorporated in the control system as described hereinafter.

The position detection system 11 can continuously determine positional data including orientations of the gantry lift device 7b within the handling plant 1 e.g. by means of transponder, GPS or radio location technology. The positional data are transmitted from the position detection system 11 to the safety controller 8 via a communication connection 12. The transmission of the positional data to the safety controller 8 can include transmission to the safety controller 10 that likewise occurs via a communication connection 12. The safety controller 10 can validate the positional data determined by the position detection system 11, for example, by means of odometry, for which purpose the safety controller 10 obtains corresponding data from the vehicle controller 9, via a further communication connection 12, and then transmits the validated positional data to the safety controller 8 via a communication connection 12. Moreover, speed limits can be set for the vehicle controller 9 by means of the safety controller 10. The driver can then no longer accelerate the gantry lift device 7b above the respectively set speed limit and if need be the device is slowed by activation of the brakes. As a result, by lowering the speed limit, the gantry lift device 7b can be slowed to a greater extent and in particular brought to a standstill in terms of an emergency stop, the closer the device comes to the transfer area X1 of the transfer zone C, so long as the gantry lift device 7b has not yet been granted authorization to enter the transfer area X1 because this is deemed to be a denied authorization. Automatic intervention in the vehicle controller 9 thus includes setting at least one speed limit, which can be lowered to zero. When setting speed limits, in particular the distance of the gantry lift device 7b from the transfer area X, X1, X2 and the direction of travel and orientation thereof, can be considered dynamically in terms of a movement profile, and so in the case of movement not in the direction of the transfer zone C or the transfer areas X, X1, X2 at that location, but e.g. in parallel thereto, intervention does not need to occur or intervention can occur with different speed settings. Likewise, intervention can be omitted when the gantry lift device 7b approaches the transfer zone C without granted authorization, but at a specified speed classed as non-critical and/or at a specified remaining distance also classed as non-critical. In this respect, corresponding settings, in particular ranges and/or limit values can be stored in the safety controller 8 and/or 10 for critical or non-critical movement profiles and can be continuously compared with the actual movement profile or its corresponding actual values. The actual positional data and actual alignments or orientations can be detected by means of the position detection system 11 for this purpose. It should be appreciated that this is also possible for the actual speeds if no separate sensor system for measuring the speed is provided for this purpose. In this manner, a decision can then be made depending upon the situation as to whether a gantry lift device 7b is approaching the transfer zone C with a critical actual movement profile and thus whether intervention in the vehicle controller 9 has to occur or whether the detected actual movement profile is non-critical and intervention can be omitted.

As a result, the gantry lift device 7b can be prevented from entering the transfer zone C or the transfer area X, X1, X2 because in the event of a correspondingly critical actual movement profile, the vehicle can already be braked to a standstill prior to entering the transfer zone C. In order to move again after such an emergency stop, provision can be made that initially corresponding authorization has to be granted by the safety controller 8. In this context, the safety controller 10 can be incorporated in the control system such that the brakes cannot be disengaged without authorization granted by the safety controller 8 and/or control signals for continued travel from the vehicle controller 9 can be ignored and cannot be converted into corresponding driving manoeuvres. An exception to this may be a change in direction effected by the driver by corresponding intervention in order to move the gantry lift device 7b away from the transfer zone C.

If the transfer area X1 for the above authorization request is not already reserved or blocked, authorization is granted, is fed back to the gantry lift device 7b or its safety controller 10 via the communication connection 12 and is stored centrally accordingly by the control system or its safety controller 8. The transfer area X1 and the associated half of the lanes 22 and 24 are then blocked for other gantry lift devices 7a, 7b if these transmit, to the safety controller 8 via its safety controller 10, a corresponding later authorization request for a transfer region X that intersects or completely corresponds to the already blocked transfer area X1. However, it is envisioned that it is possible to define a third transfer area X, between the already blocked transfer areas X1 and X2, which would include in the center the lane 25 and the corresponding portions of the adjoining lanes 24 and 26. The lane 24 could then be used with its respective mutually adjoining portions by the gantry lift device 7b in the transfer area X1 and a gantry lift device 7a, 7b in the third transfer area X at the same time. The same applies for the lane 26. Generally speaking, this means that a transfer area X can be allocated to every second storage area 6a at the same time. Accordingly, portions of the lane that is allocated to the intermediate storage area 6a without a transfer area X are used by the gantry lift devices 7a, 7b travelling in the transfer areas X that adjoin on the longitudinal side.

Granted authorization can be signalled to the driver just like denied authorization to enter by a display in the driver's cab 15 or also by a set of traffic lights 17. After authorization to enter has been granted, the driver can travel in the lane 23 and thus the transfer area X1, set down or pick up the container 2 and return to the manual area B. The position detection system 11 of the gantry lift device 7b recognizes as soon as the device has left the transfer area X1 and transmits this to the safety controller 10 accordingly. As a result, the respective safety controller 10 in each gantry lift device 7b recognizes when the device leaves the corresponding transfer area X, X1, X2 and transmits this to the safety controller 8 in particular in the form of releasing the corresponding transfer area X, X1, X2, whereby the associated lanes are then released for defining new transfer areas X or corresponding requests. As a result, all the released lanes 21 to 29 or transfer areas X, X1, X2 of the transfer zone C are processed by the safety controller 8 in a neutral state of readiness in terms of a neutral initial state. In the state of readiness, the lanes 21 to 29 are not blocked as part of a transfer area X, X1, X2 for an automated guided gantry lift device 7a or for a manually guided gantry lift device 7b but are free or available for transfer areas X to be newly defined and authorization requests in this regard. A new authorization to enter can then be granted in the time sequence of the request that is made first. The state stored in the safety controller 8 is then changed accordingly, and so the associated lanes are no longer free in the state of readiness but are allocated as blocked lanes to the transfer area X for which the authorization to enter was granted for a gantry lift device 7a or 7b.

When an automated guided gantry lift device 7a is travelling in the transfer zone C or the transfer area X2 defined therein, the previous statements apply accordingly. The necessary request for authorization to enter the transfer area X2 is in this case likewise automatically triggered by the safety controller 10 of the gantry lift device 7a because a transport order was transmitted thereto by the management system, requiring travel in the lane 27. A result of this is that the lanes 26 to 28 must be released in the safety controller 8 or be in a state of readiness in order to define the transfer area X2 and in this respect grant authorization to enter to the automated guided gantry lift device 7a. If this is not the case, the safety controller 10 prevents entry in that the gantry lift device 7a automatically stops and waits at a suitable location or at least slows its travel. A corresponding position detection system 11 likewise determines when the device has left the transfer area X2 and this is transmitted to the safety controller 8 via the safety controller 10 and is stored there, whereby the lanes 26 to 28 are then released and are in the state of readiness.

The safety controller 8 can always only grant authorizations to enter but cannot then deny or withdraw already granted authorizations. Releasing is always effected by the safety controller 10 of the respective gantry lift device 7a, 7b in terms of a return. Therefore, this is also known to the safety controller 10 in the vehicle and renewed entry into the corresponding transfer area X can be prevented if no new authorization from the safety controller 8 has been granted.

As soon as the safety controller 10 recognizes, by comparing the positional data, that a gantry lift device 7a, 7b is approaching the transfer zone C with a critical movement profile, without authorization to enter the transfer area X, X1, X2 having been granted to the gantry lift device 7a, 7b, corresponding automatic intervention in the respective vehicle controller 9 can occur via the safety controller 10 in order to prevent complete or partial entry into the transfer zone C and, if required, to effect braking to a standstill beforehand. This applies not only when authorization was denied for a request, but also when an authorization request was not triggered or when the safety controller 10 in the vehicle has not received a granted authorization sent by the central safety controller 8.

FIG. 3 shows a diagram illustrating the function of the control system with a gantry lift device 7b involved in the control system. The manually guided gantry lift device 7b, illustrated by way of example, accordingly has the driver's cab 15 provided for an operator travelling with the vehicle. Alternatively, however, the gantry lift device 7b can also, as described above, be operated in a fully automated manner as an automated guided gantry lift device 7a in the sense of an AGV or can be operated in a semi-automated manner. In this case, the driver's cab 15 can be omitted. Moreover, the central and in particular stationary safety controller 8 and the vehicle controller 9 and safety controller 10, arranged in the vehicle, and the position detection system 11 and the corresponding communication connections 12 are schematically illustrated as further components of the control system. The central safety controller 8 and the safety controller 10 may be formed as fail-safe programmable logic controllers. Corresponding controllers are also referred to as PLCs or Failsafe PLCs or F-PLCs. The safety controller 8 can communicate with all the transport vehicles operated in the handling plant 1, in particular gantry lift devices 7a, 7b, and in particular their respective safety controller 10, via corresponding communication connections 12.

The control system of the handling plant 1 is thus formed and configured, on the one hand, to grant or deny authorizations to enter the transfer zone C or transfer areas X, X1, X2 defined therein to the gantry lift devices 7a, 7b by means of its safety controller 8 in terms of the method in accordance with the present invention described above, and on the other hand, to perform automatic intervention in the vehicle controller 9 of the gantry lift devices 7a, 7b by means of its safety controller 10 in the absence of a granted authorization to enter a transfer area X, X1, X2 of the transfer zone C, such that at least complete entry, but optionally even partial entry, of these gantry lift devices 7a, 7b into the transfer zone C is prevented. Therefore, the method, in accordance with the present invention, and the corresponding control system permit reliable control and monitoring of the entire fleet of gantry lift devices 7a, 7b entering the transfer zone C and the lanes thereof, in order to coordinate this without any collisions. This allows optionally the entire transfer zone C and thus also each transfer area X, X1, X2 defined therein, in particular at the boundaries to the automated area A and to the manual area B, to be formed without barriers. Accordingly, there is no need to install any physical restrictions such as fences, barriers or gates at those locations in order to prevent unauthorized partial or complete entry into the transfer zone C and in particular travel through the automated area A or manual area B. This is ensured by the possible automatic intervention in the vehicle controller 9.

A direct transfer of containers 2 between a gantry lift device 7a, 7b and a transport vehicle having a loading surface for containers 2 without in the meantime placing the containers 2 outside the transport vehicle is also possible in the transfer zone C using the invention described above. In this case, the gantry lift device 7a, 7b then drives over the loading surface of the transport vehicle, the dimensions of which are such that the transport vehicle with the loading surface fits between the running gear unit supports 13 of the gantry lift device 7a, 7b, in order to pick up a container 2 and unload same therefrom or set down same and place same thereon. In the case of such a transfer, the gantry lift device 7a, 7b and the transport vehicle having the loading surface are in the corresponding transfer area X at the same time.

Corresponding transport vehicles having a loading surface can likewise be formed as internal transport vehicles of the handling plant 1 and, similarly to the gantry lift devices 7a, 7b, can be operatively connected to the central safety controller 8 and the vehicle controller 9 in each case via a safety controller 10 in the vehicle. The loading surface is then typically delimited on its sides by a plurality of guide elements. The guide elements have guide surfaces that extend in an inclined manner. In this case, the guide surfaces extend in a manner directed upwards and outwards away from the loading surface and extend in a manner directed downwards and inwards towards the loading surface. The guide elements may be arranged in pairs on opposing sides, in particular longitudinal sides and/or narrow sides, of the loading surface. The guide surfaces of a pair of guide elements form a type of funnel, the inclined shape of which tapers towards the loading surface in order to be able to guide a container 2, which is to be transported, and in the case of ISO containers, in particular its corner fittings when being set down on the loading surface, and to be able to orient same in relation to the loading surface. Internal transport vehicles of this type can also be formed as a trailer truck, the towing vehicle of which is also referred to as a terminal truck either individually or with a trailer including the loading surface. Terminal trucks can be guided manually or in an automated manner. In the case of a further variant of automated guided internal transport vehicles having a loading surface and guided elements, these are not part of a trailer but are designed as a type of travelling platform with its own travel drive. In this case, the platform and thus also the loading surface can be raised and lowered by means of a lifting drive in order to be able to actively pick up containers 2 from a transfer frame or set down containers thereon.

Likewise, transport vehicles having a loading surface for containers can also be external transport vehicles, which are authorized for use on public roads. However, these transport vehicles do not have any guide elements but have locking elements, such as for example so-called twist locks, which engage into the corner fittings of the containers 2 for locking the containers 2 on the loading surface. The external transport vehicles can be for example conventional trucks designed as trailer trucks and can move into and out of the handling plant 1 through at least one passing area (not shown) provided within the boundary 1a in order to deliver or collect containers 2. The passing area can have a security checkpoint for registering arrival and departure, including identification of the arriving and departing manually guided external transport vehicles and their drivers.

If a container 2 is intended to be transferred to a transport vehicle having a loading surface, the minimum surface area of a transfer area X can deviate from that in the case of the gantry lift devices 7a, 7b. This is to be considered accordingly by the control system or its safety controllers 8 and/or 10. In this case, an authorization to enter can also be granted even though the transport vehicle with the loading surface or the gantry lift device 7a, 7b has not yet left the transfer area X. However, it may then be necessary in this case for the corresponding position detection system 11, for example, to recognize when a target position of the internal transport vehicle first entering the transfer area X is reached. In the case of external transport vehicles that do not have a position detection system 11 and/or a safety controller 10 in the vehicle, which can be incorporated in the control system of the handling plant 1, stationary sensor systems, in particular position detection systems, can then be used to recognize when corresponding target positions have been reached. Since intervention, in accordance with the present invention, in the vehicle controller of external transport vehicles is not possible, provision can be made that an internal transport vehicle may then enter the transfer zone C, or its respective transfer area X only after the external transport vehicle has reached its target position, this is recognized, and thus is known to the control system. It may also be necessary for the driver of the external transport vehicle to acknowledge this. Only then is authorization to enter the transfer area X granted to the internal transport vehicle in order to load or unload the external transport vehicle waiting at that location.

In order to manage the store 6, i.e. for placing the containers 2 into storage or removing them from storage in the store 6, the stacking cranes already mentioned above and formed as gantry cranes may additionally be provided, the cranes being used as handling devices and picking up containers 2 from the gantry lift devices 7a, 7b, or from internal or external transport vehicles having a loading surface, or transferring containers thereto. It will be appreciated that a connection to rail traffic is also possible in this manner in the handling plant 1.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A method for controlling travel of an automated guided transport vehicle and a manually guided transport vehicle in a transfer zone having a container transfer area, wherein the transfer zone connects an automated area for the automated guided transport vehicle to a manual area for the manually guided transport vehicle, and wherein the transport vehicles are configured to travel in the transfer zone in order to directly transfer a container in the container transfer area between the transport vehicles located in the container transfer area at the same time, or to place or pick up a container outside of the transport vehicles in the transfer area, the method comprising:
granting or denying an authorization for the transport vehicles to enter the transfer zone;
in response to an absence of a granted authorization for the manually guided transport vehicle to enter the transfer zone, automatically triggering an intervention, via a vehicle controller of the manually guided transport vehicle, to prevent entry of the manually guided transport vehicle into the transfer zone.

2. The method as claimed in claim 1, wherein the intervention is triggered when the manually guided transport vehicle approaches the transfer zone with a critical movement profile and without having obtained a granted authorization to enter the transfer zone.

3. The method as claimed in claim 1, wherein the intervention includes setting a speed limit for the manually guided transport vehicle.

4. The method as claimed in claim 1, wherein the container transfer area includes at least a first lane of the transfer zone that connects the automated area to the manual area, and wherein the container transfer area extends over at least portions of two adjacent lanes that adjoin the first lane and connect the automated area to the manual area.

5. The method as claimed in claim 1, wherein a request by the transport vehicles to enter the transfer zone is necessary to obtain the authorization to enter the transfer zone.

6. The method as claimed in claim 1, wherein the authorization to enter the container transfer area of the transfer zone is granted to at least one of the transport vehicles if the container transfer area is in a neutral state of readiness, and the authorization to enter the container transfer area is denied to the at least one of the transport vehicles if the container transfer area is at least partially blocked by another one of the transport vehicles.

7. The method as claimed in claim 1, wherein the authorization to enter the container transfer area of the transfer zone is granted to both the automated and manually guided transport vehicles in succession to set down or pick up the container for transport from the automated area to the manual area, or from the manual area to the automated area.

8. A control system for controlling travel of an automated guided transport vehicle and a manually guided transport vehicle, the control system comprising:
a transfer zone having a container transfer area;
an automated area for the automated guided transport vehicle; and
a manual area for the manually guided transport vehicle;
wherein the transfer zone connects the automated area to the manual area;
wherein the transport vehicles are configured to travel in the transfer zone in order to (i) directly transfer a container in the container transfer area between two of the transport vehicles that are located in the container transfer area at the same time, or (ii) place or pick up a container in the container transfer area;
wherein the system is configured to grant or deny an authorization for the transport vehicles to enter the transfer zone; and
wherein, in response to an absence of a granted authorization for the manually guided transport vehicle to enter the transfer zone, the system is configured to trigger an intervention to prevent the manually guided transport vehicle from entering the transfer zone.

9. The control system as claimed in claim 8, further comprising a safety controller and a vehicle controller of the transport vehicles, wherein, in response to an absence of a granted authorization to enter the transfer zone, the safety controller cooperates with the vehicle controller in order to trigger an intervention in the vehicle controller.

10. The control system as claimed in claim 8, further comprising a central safety controller that is configured to grant or deny the authorization to enter the transfer zone in response to a request by the transport vehicles.

11. The control system as claimed in claim 8, further comprising a position detection system that is configured to recognize when one of the transport vehicles approaches the transfer zone, or the container transfer area defined in the transfer zone, with a critical movement profile.

12. A container handling plant comprising:
a control system for controlling travel of an automated guided transport vehicle and a manually guided transport vehicle;
a transfer zone having a container transfer area;
an automated area for the automated guided transport vehicle; and
a manual area for the manually guided transport vehicle;
wherein the transfer zone connects the automated area to the manual area;

wherein the transport vehicles are configured to travel in the transfer zone in order to (i) directly transfer a container in the container transfer area between two of the transport vehicles that are located in the container transfer area at the same time, or (ii) place or pick up a container in the container transfer area;

wherein the system is configured to grant or deny an authorization for the transport vehicles to enter the transfer zone; and wherein, in response to an absence of a granted authorization for the manually guided transport vehicle to enter the transfer zone, the system is configured to trigger an intervention to prevent the manually guided transport vehicle from entering the transfer zone.

13. The container handling plant as claimed in claim 12, wherein the container transfer area is formed without any barriers between the automated area or the manual area.

14. The method as claimed in claim 2, wherein the intervention includes setting a speed limit for the manually guided transport vehicle.

15. The method as claimed in claim 14, wherein the container transfer area includes at least a first lane of the transfer zone that connects the automated area to the manual area, and wherein the container transfer area extends over at least portions of two adjacent lanes that adjoin the first lane and that connect the automated area to the manual area.

16. The method as claimed in claim 15, wherein a request by the transport vehicles to enter the transfer zone is necessary to obtain the authorization to enter the transfer zone.

17. The method as claimed in claim 16, wherein the authorization to enter the container transfer area of the transfer zone is granted to at least one of the transport vehicles if the container transfer area is in a neutral state of readiness, and the authorization to enter the container transfer area is denied to the at least one of the transport vehicles if the container transfer area is at least partially blocked by another one of the transport vehicles.

18. The method as claimed in claim 17, wherein the authorization to enter the container transfer area of the transfer zone is granted to both the automated and manually guided transport vehicles in succession to set down or pick up the container for transport from the automated area to the manual area, or from the manual area to the automated area.

19. The control system as claimed in claim 9, further comprising a central safety controller that is configured to grant or deny the authorization to enter the transfer zone in response to a request by the transport vehicles.

20. The control system as claimed in claim 19, further comprising a position detection system that is configured to recognize when one of the transport vehicles approaches the transfer zone, or the container transfer area defined in the transfer zone, with a critical movement profile.

* * * * *

UNITED STATES PATENT AND TRADEMARK OFFICE
CERTIFICATE OF CORRECTION

PATENT NO. : 11,518,627 B2
APPLICATION NO. : 16/647518
DATED : December 6, 2022
INVENTOR(S) : Sascha Pollak von Emhofen It is certified that error appears in the above-identified patent and that said Letters Patent is hereby corrected as shown below:

In the Specification

Column 7
Line 5 "tin" should be --t in--

Signed and Sealed this
Tenth Day of January, 2023

*Katherine Kelly Vidal*

Katherine Kelly Vidal
*Director of the United States Patent and Trademark Office*